US012697547B2

(12) United States Patent
Luo et al.

(10) Patent No.: US 12,697,547 B2
(45) Date of Patent: Aug. 4, 2026

(54) METHOD AND APPARATUS FOR SENDING INFORMATION, TRANSFERRING RESOURCE IN GAME, MEDIUM AND DEVICE

(71) Applicant: NETEASE (HANGZHOU) NETWORK CO., LTD., Hangzhou (CN)

(72) Inventors: Qihua Luo, Hangzhou (CN); Jiancong Liu, Hangzhou (CN)

(73) Assignee: NETEASE (HANGZHOU) NETWORK CO., LTD., Hangzhou city (CN)

( * ) Notice: Subject to any disclaimer, the term of this patent is extended or adjusted under 35 U.S.C. 154(b) by 498 days.

(21) Appl. No.: 18/253,404

(22) PCT Filed: Feb. 22, 2021

(86) PCT No.: PCT/CN2021/077303
§ 371 (c)(1),
(2) Date: May 18, 2023

(87) PCT Pub. No.: WO2022/105071
PCT Pub. Date: May 27, 2022

(65) Prior Publication Data
US 2024/0001237 A1     Jan. 4, 2024

(30) Foreign Application Priority Data

Nov. 19, 2020    (CN) .......................... 202011299886.6

(51) Int. Cl.
*A63F 13/5375*        (2014.01)
*A63F 13/5378*        (2014.01)
(Continued)

(52) U.S. Cl.
CPC ...... *A63F 13/5375* (2014.09); *A63F 13/5378* (2014.09); *A63F 13/55* (2014.09); *A63F 13/87* (2014.09)

(58) Field of Classification Search
CPC ................ A63F 13/5372; A63F 13/533; A63F 13/5378; A63F 13/79; A63F 13/822; A63F 13/57; A63F 13/825; A63F 2300/5573
See application file for complete search history.

(56) References Cited

U.S. PATENT DOCUMENTS 8,460,088 B1 *   6/2013   Shimizu ................ A63F 13/795
                                                        463/16
9,895,613 B1 *   2/2018   Holtz ...................... A63F 13/79
(Continued)

FOREIGN PATENT DOCUMENTS

CN          108211349 A      6/2018
CN          109432771 A      3/2019
(Continued)

OTHER PUBLICATIONS

CN109432771A. Description—English machine translation. Espacenet. <URL: https://worldwide.espacenet.com/patent/search/family/065545643/publication/CN109432771A?q=CN109432771> (Year: 2019).*

(Continued)

*Primary Examiner* — Carl V Larsen
(74) *Attorney, Agent, or Firm* — Qinghong Xu

(57)        ABSTRACT
A method and an apparatus for sending information in a game, a method and an apparatus for transferring a virtual resource in a game, a method and an apparatus for generating configuration information, a computer-readable storage medium and an electronic device are provided. The method for sending information in the game includes: in response to a triggering operation on a first associated region
(Continued)

assistance request information of a target virtual resource sent by a first game client is received — S610 in response to a triggering operation on a target second associated region of a game backpack button, a virtual resource list of a game player corresponding to a second game client is displayed in the second game client — S620 in response to a triggering operation of selecting the target virtual resource in the virtual resource list, the target virtual resource in the virtual resource list of the game player corresponding to the second game client is transferred into a virtual resource list of a game player corresponding to the first game client — S630 of a game backpack button, displaying a virtual resource requirement list of a game player corresponding to a first game client in the first game client; and in response to a triggering operation of selecting a target virtual resource in the virtual resource requirement list, sending assistance request information of the target virtual resource to a second game client.

20 Claims, 12 Drawing Sheets

(51) Int. Cl.
　　　*A63F 13/55*　　　　(2014.01)
　　　*A63F 13/87*　　　　(2014.01)

(56)　　　　　　　References Cited

U.S. PATENT DOCUMENTS

| | | | |
|---|---|---|---|
| 11,062,284 B1 * | 7/2021 | Cunningham | A63F 13/71 |
| 11,135,516 B1 * | 10/2021 | Koch | A63F 13/79 |
| 2010/0251180 A1 * | 9/2010 | Cragun | G06F 3/04812 |
| | | | 715/834 |
| 2010/0306702 A1 * | 12/2010 | Warner | G06F 3/0482 |
| | | | 715/834 |
| 2011/0265041 A1 * | 10/2011 | Ganetakos | A63F 13/533 |
| | | | 715/834 |
| 2012/0238362 A1 * | 9/2012 | Janis | A63F 13/825 |
| | | | 463/31 |
| 2013/0084995 A1 * | 4/2013 | Yamaguchi | A63F 13/79 |
| | | | 463/42 |
| 2013/0288800 A1 * | 10/2013 | Takushima | A63F 13/358 |
| | | | 463/42 |
| 2013/0303266 A1 * | 11/2013 | Kishimoto | A63F 13/75 |
| | | | 463/25 |
| 2014/0256389 A1 | 9/2014 | Wentling et al. | |
| 2017/0056777 A1 * | 3/2017 | Nahari | A63F 13/85 |
| 2019/0295306 A1 * | 9/2019 | Weston | A63F 13/56 |
| 2020/0316471 A1 * | 10/2020 | Otomo | A63F 13/30 |
| 2021/0042819 A1 * | 2/2021 | Zhang | G06Q 30/0643 |
| 2021/0138349 A1 * | 5/2021 | Zien | A63F 13/69 |
| 2021/0245061 A1 * | 8/2021 | Kaushik | A63F 13/5375 |

FOREIGN PATENT DOCUMENTS

| | | | |
|---|---|---|---|
| CN | 110124310 A | 8/2019 |
| CN | 110270098 A | 9/2019 |
| CN | 110841284 A | 2/2020 |
| CN | 111084991 A | 5/2020 |
| CN | 111352568 A | 6/2020 |
| CN | 111450538 A | 7/2020 |
| CN | 111905364 A | 11/2020 |
| JP | 2003196420 A | 7/2003 |
| JP | 2013208220 A | 10/2013 |

OTHER PUBLICATIONS

1st Office Action dated Aug. 27, 2021 of Chinese Application No. 202011299886.6.

Zhan Shang, "How to send teammate hero name and equipment at the same time in League of Legends game", Jul. 1, 2019.

How to transfer equipment to teammates in Auto Chess of Honor of Kings—Method for transferring equipment to teammates in Mock Battle (Mo Ni Zhan) of Honor of Kings, Dec. 3, 2019.

International Search Report dated Aug. 17, 2021 of International Application No. PCT/CN2021/077303.

The real "Caravan Stories" capture dairy from the multi-Area: Complete the main quest of the human edition at once! 4Gamer.net [online], https://www.4gamer.net/games/352/G035268/20171206068/, Dec. 8, 2017.

The real "Caravan Stories" capture dairy from the multi-Area: Complete the main quest of the human edition at once! 4Gamer.net [online], https://www.4gamer.net/games/352/G035268/20171206068/ screenshot.html?num=045, Dec. 6, 2017.

The real "Caravan Stories" capture dairy from the multi-Area: Complete the main quest of the human edition at once! 4Gamer.net [online], https://www.4gamer.net/games/352/G035268/20171206068/ screenshot.html?num=046, Dec. 6, 2017.

Guild and [Formula] Caravan Stories(Caravan Stow Leeds) [online], https://web.archive.org/eb/20200925072326/ https://caravan-stories.com/help/guild/, Sep. 25, 2020.

Twitter [Online], Jan. 24, 2019, https://Twitter.Com/iwanov_forCS/status/1088393453291991040.

2nd Office Action dated Nov. 25, 2021 of Chinese Application No. 202011299886.6.

1st Office Action dated Apr. 25, 2023 of Japanese Application No. 2022-525478.

\* cited by examiner a first associated region is configured for a game backpack button, such that a first game client triggers the first associated region through the game backpack button to send assistance request information of the virtual resource to a second game client          S110 at least one second associated region is configured for the game backpack button, such that the first game client triggers a target second associated region through the game backpack button to transfer the virtual resource to a game player of a target second game client          S120

FIG.1 in response to a triggering operation on a first associated region of a game backpack button, a virtual resource requirement list of a game player corresponding to a first game client is displayed in the first game client

S310 in response to a triggering operation of selecting a target virtual resource in the virtual resource requirement list, assistance request information of the target virtual resource is sent to a second game client

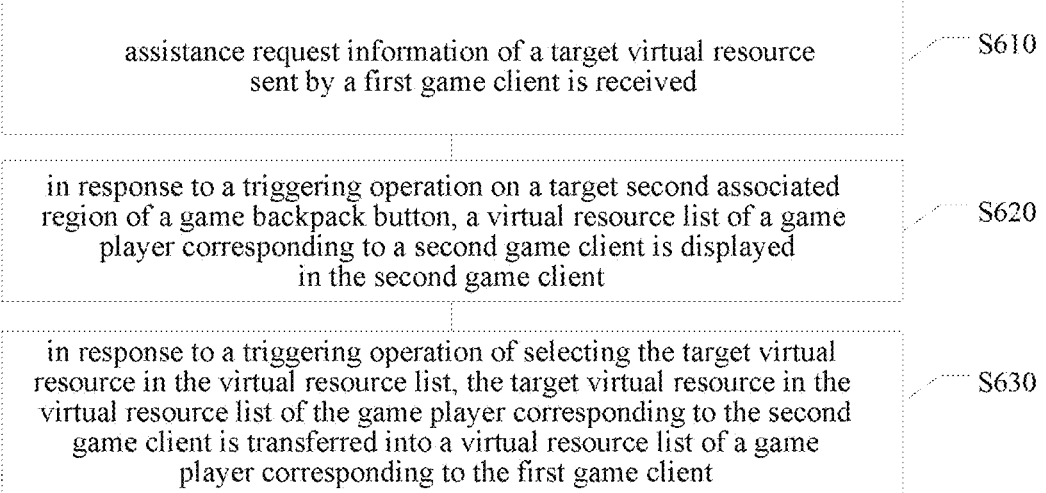

assistance request information of a target virtual resource
sent by a first game client is received     S610 in response to a triggering operation on a target second associated
region of a game backpack button, a virtual resource list of a game
player corresponding to a second game client is displayed
in the second game client     S620 in response to a triggering operation of selecting the target virtual
resource in the virtual resource list, the target virtual resource in the
virtual resource list of the game player corresponding to the second
game client is transferred into a virtual resource list of a game
player corresponding to the first game client     S630

METHOD AND APPARATUS FOR SENDING INFORMATION, TRANSFERRING RESOURCE IN GAME, MEDIUM AND DEVICE

CROSS-REFERENCE

This application is the U.S. National Phase application of PCT International Application No. PCT/CN2021/077303, filed on Feb. 22, 2021, which is based on and claims priority to Chinese Patent Application No. 202011299886.6, entitled "INFORMATION SENDING AND RESOURCE TRANSFERRING METHOD AND APPARATUS IN GAME, MEDIUM, AND DEVICE", filed on Nov. 19, 2020, the entire content of both of which is incorporated herein by reference for all purposes.

TECHNICAL FIELD

The present disclosure relates to a field of game technology, and more particularly, to a method and an apparatus for sending information in a game, a method and an apparatus for transferring a virtual resource in a game, a method and an apparatus for generating configuration information, a computer-readable storage medium, and an electronic device.

BACKGROUND

Currently in some group combat games, to increase odds of winning, it is usually necessary to request assistance and transfer game supply between teammates.

SUMMARY

A first aspect of the present disclosure provides a method for sending information in the game, and the method includes:

in response to a triggering operation on a first associated region of a game backpack button, displaying a virtual resource requirement list of a game player corresponding to a first game client in the first game client;

in response to a triggering operation of selecting a target virtual resource in the virtual resource requirement list, sending assistance request information of the target virtual resource to a second game client.

A second aspect of the present disclosure provides a method for transferring a virtual resource in a game, and the method includes:

receiving assistance request information of a target virtual resource sent by a first game client;

in response to a triggering operation on a target second associated region of a game backpack button, displaying a virtual resource list of a game player corresponding to a second game client in the second game client;

in response to a triggering operation of selecting the target virtual resource in the virtual resource list, transferring the target virtual resource in the virtual resource list of the second game client into a virtual resource list of a game player corresponding to the first game client;

wherein the target second associated region includes a region where the second game client is triggered by the game backpack button in response to the assistance request information of a target first game client.

A third aspect of the present disclosure provides a method for generating configuration information, the configuration information is used for transferring a virtual resource in a game, the method includes:

configuring a first associated region for a game backpack button, such that a first game client triggers the first associated region through the game backpack button to send assistance request information of the virtual resource;

configuring at least one second associated region for the game backpack button, such that the first game client triggers a target second associated region through the game backpack button to transfer the virtual resource to a game player of a target second game client;

wherein the first game client includes a game client corresponding to a game player in a same game group as a game player corresponding to the second game client.

It should be understood that the foregoing general description and the following detailed description are only illustrative and cannot limit the present disclosure.

BRIEF DESCRIPTION OF THE DRAWINGS

The drawings herein are incorporated into the specification and constitute a part of the specification, show embodiments that conform to the present disclosure, and together with the specification are to explain the principle of the present disclosure. Obviously, the drawings in the following description are only some embodiments of the present disclosure. For those skilled in the art, other drawings can be obtained from these drawings without creative work.

FIG. 1 shows a flowchart of a method for generating configuration information in an embodiment of the present disclosure;

FIG. 3 shows a flowchart of a method for sending information in a game in an embodiment of the present disclosure;

FIG. 6 shows a flowchart of a method for transferring a virtual resource in a game in an embodiment of the present disclosure;

DETAILED DESCRIPTION

Figure 2:
FIG. 2 shows a game operation interface generated by applying a method for generating configuration information in accordance with an embodiment of the present disclosure.

Example embodiments will now be described more fully with reference to the accompanying drawings. However, the embodiments may be implemented in various forms and should not be construed as limited to the examples set forth herein; rather, providing these embodiments makes the present disclosure more comprehensive and complete, and conveys the concepts of the embodiments comprehensively to those skilled in the art. The same reference numerals in the drawings represent the same or similar structures, and thus repeated descriptions thereof will be omitted. In addition, the drawings are merely schematic illustrations of the present disclosure and are not necessarily drawn to scale.

The terms 'a', 'an', 'the' and 'said' are used to indicate the presence of one or more elements/components etc.; the terms 'include' and 'have' are used to indicate open-ended inclusions and means that there have additional elements/components etc. In addition to the listed elements/components etc., the terms 'first' and 'second' etc. are used only as marks, not the limitation to the number of objects.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In addition, the drawings are merely schematic illustrations of the present disclosure and are not necessarily drawn to scale. The same reference numerals in the drawings identify the same or similar parts, and thus repeated descriptions thereof will be omitted. Some of the block diagrams shown in the drawings indicate functional entities and do not necessarily have to correspond to physically or logically independent entities.

In team games, teammates may request assistance for supply and give the supply to each other in order to increase team's odds of winning.

In some related art, for an assistance-seeker, when the assistance-seeker requests the assistance with a required resource, a process of "checking a lacking supply-inputting text or voice to request assistance-waiting for teammate's response-communicating with a handover location-looking for a supply that is given-completing the exchange" needs to be performed. Specifically, the assistance-seeker needs to open his/her own game backpack interface by clicking or long-pressing a game backpack button to check the supplies he/she owns, then determine a supply he/she lacks based on the owned supplies, and after identifying the lacking supply, the assistance-seeker may send assistance request information to his/her teammate in a form of voice or text input to inform the teammate of the supply he/she needs.

For a giver, a giving process of "checking owned supplies-communicating with a handover location-dropping a supply" needs to be performed. Specifically, after receiving the assistance request information sent by the assistance-seeker, the teammate may open his/her own game backpack interface by clicking or long-pressing the game backpack button to check whether he/she owns the supply required by the assistance-seeker. If he/she definitely owns the required supply, the teammate communicates with the assistance-seeker about the handover location and drops the supply at the handover location, and then the assistance-seeker goes to the handover location to pick up the supply dropped by the teammate, so as to implement the assistance request for a virtual resource and the virtual resource transfer.

However, the above manner of sending assistance request information and transferring supply is cumbersome overall and complicated in operation, which reduces efficiency of sending assistance request information and efficiency of transferring the supply. There is the possibility that the supply dropped by the giver is picked up by others by mistake, thus in turn reducing accuracy of transferring supplies.

In the present disclosure, first, a method for generating configuration information is provided.

Figure 1:
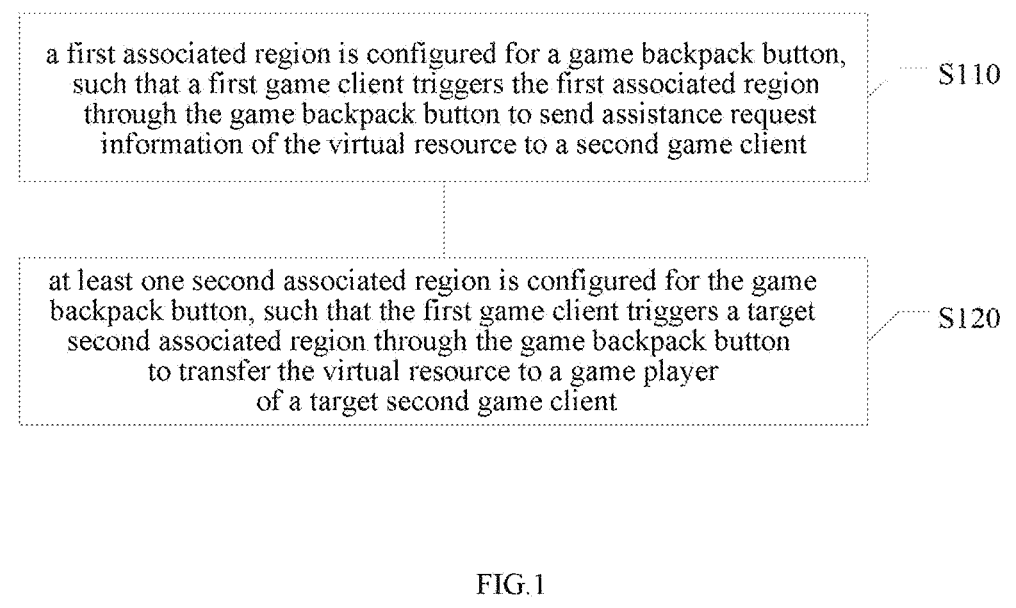

FIG. 1 shows a flowchart of a method for generating configuration information in an embodiment of the present disclosure. The configuration information generated by the method for generating the configuration information provided by the embodiment is used for transferring a virtual resource in a game. Referring to FIG. 1, the method includes steps S110 and S120:

step S110, a first associated region is configured for a game backpack button, such that a first game client triggers the first associated region through the game backpack button to send assistance request information of the virtual resource to a second game client.

In an embodiment, the game backpack may include an item storage space on a game character corresponding to a game player. In a game system, a certain number of item storage bars are set on the game character corresponding to each game player, such that the game player may place the virtual resource in the game, such as a game setup or a game prop. The game backpack button is an opening operation button of a game backpack interface. The game backpack interface is opened in response to that the game player performs an opening operation on the game backpack button, and the virtual resource carried by the game character is displayed through the game backpack interface. The opening operation on the game backpack button is set to a click operation and/or a long-press operation.

In step S110, the first game client may include a client corresponding to a first game player who needs to send the assistance request information of the target virtual resource, and that is, a client corresponding to an assistance-seeker party of the virtual resource in the game. The second game client includes a client corresponding to another game player in the same game group as a game player corresponding to the first game client, and that is, a client corresponding to a giving party of the virtual resource in the game. Game players in the same game group may play to achieve the same game goals, or to defeat game players from other game groups in the game For example, the specific implementation of step S110 may be as follows: the first associated region is added for the game backpack button in the game operation interface, as shown in a lower left corner of FIG. 2, such that the game player of the first game client may trigger the first associated region through the game backpack button. When the first associated region is triggered, the virtual resource requirement list of the game player corresponding to the first game client may be displayed in the game operation interface of the first game client, and then the assistance request information of the target virtual resource may be broadcast to all game players in the same group in response to the operation of triggering the target virtual resource in the virtual resource requirement list, so as to complete the sending of the assistance request information of the target virtual resource.

The first associated region may be added at any location within a preset distance range close to the game backpack button. Specifically, the preset distance range may be set according to different games or game devices. The setting of the distance range needs to take into account factors such as ease of operation for the game player, a distance or position conflict with other controls in the game interface, etc.

step S120, at least one second associated region is configured for the game backpack button, such that the first game client triggers a target second associated region through the game backpack button to transfer the virtual resource to a game player of a target second game client.

In an embodiment, the second game client may include any game client corresponding to another game player in the same game group as a game player corresponding to the first game client. For the game player of another game client in the same group as the first game client, the first game client may be the assistance-seeker party of the virtual resource in the game as described in above step S110. The first game client may also be the giving party of the virtual resource, and that is, the first game client may receive the assistance request information of the virtual resource sent by another game client, and transfer its own virtual resource to the assistance-seeker party of the virtual resource.

In step S120, the first game client includes a client corresponding to the giving party of the virtual resource in the game, and the second game client includes a client corresponding to the assistance-seeker party of the virtual resource in the game.

For example, a second associated region may be added to the game backpack button in the game operation interface. A number of the second associated regions may be determined according to a number of other game players in the same group as the game player of the first game client.

Specifically, at least one second associated region may be configured for the game backpack button of the game player of the first game client in the operation interface, and an identification corresponding to a game player may be displayed in each second associated region. The game backpack button of the game player of the first game client may be triggered at different second associated regions, so as to transfer the virtual resource to game players of different second game clients. When the second associated region corresponding to a game player of the target second game client is configured for the game backpack button of the game player of the first game client, the target second associated region is triggered, such that the virtual resource selected by the game player of the first game client may be transferred to the virtual resource list corresponding to the game player of the target second game client.

For example, the second associated region corresponding to another game player in the same group as the first game client may be added for the game backpack button in the game operation interface, such as regions corresponding to words "①, ②, ③" in the lower left corner of FIG. 2, such that the game player of the first game client may trigger the second associated region through the game backpack button, and the game player corresponding to the triggered second associated region is determined as a target game player.

When the game player of the first game client triggers a certain second associated region through the game backpack button, the virtual resource list of the game player corresponding to the game client may be displayed in the first game client. The virtual resource list includes virtual resources such as weapons, healing supplies, ammunition, etc. currently owned by the game player, and by triggering the virtual resource, requested in the assistance request information that is sent by the second game client, in the virtual resource list, the game player of the first game client may transfer the virtual resource to a resource list of the target game player corresponding to the triggered second associated region.

The second associated region may be added at any location within a preset distance range close to the game backpack button. Specifically, the preset distance range may be set according to different games or game devices. The setting of the distance range needs to take into account factors such as ease of operation for the game player, a distance or position conflict with other controls in the game interface, etc.

It should be noted that there is no overlapping part between positions of the first associated region and the second associated region, and there is no overlapping part between positions of the respective second associated regions. The same game client may be either the assistance-seeker party of the virtual resource or the giving party of the virtual resource, may configure the first associated region and/or the second associated region for the game backpack button of the same game player.

Through the above steps S110-S120, based on the first associated region and the second associated region configured for the game backpack button, the assistance request information may be sent and the virtual resource may be transferred, which simplifies the operation steps of the assistance request information and the virtual resource transfer in the game, and improves the efficiency of the virtual resource transfer. Moreover, a directed transfer of the virtual resource may be achieved and accuracy of the virtual resource transfer may be improved by configuring the second associated region corresponding to the game players of other game clients in the same group for the game backpack button.

Figure 3:
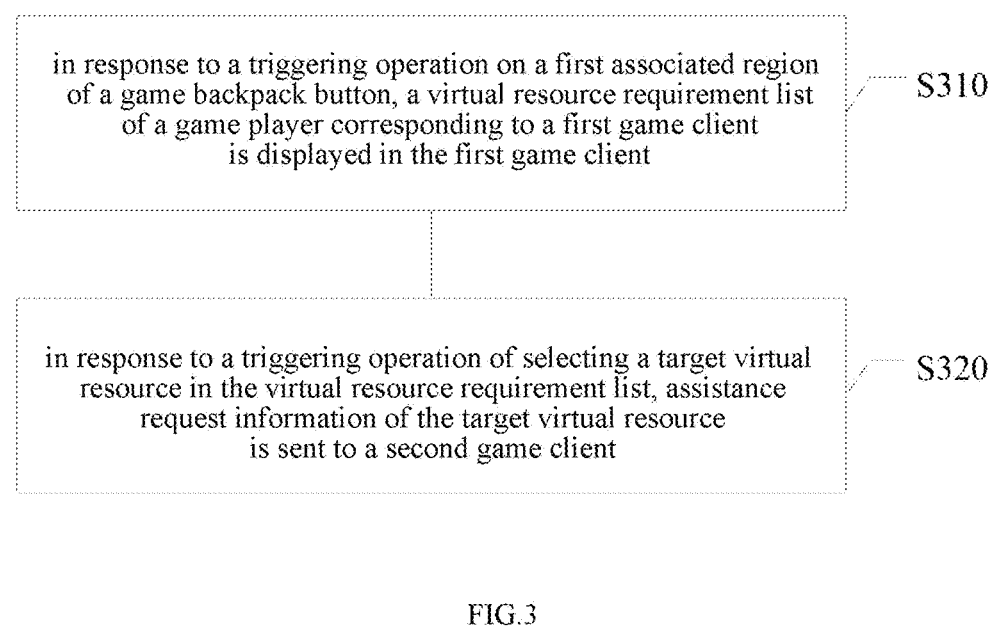

FIG. 3 shows a flowchart of a method for sending information in a game in an embodiment of the present disclosure. Referring to FIG. 3, the method may include steps S310 and S320:

step S310, in response to a triggering operation on a first associated region of a game backpack button, a virtual resource requirement list of a game player corresponding to a first game client is displayed in the first game client;

step S320, in response to a triggering operation of selecting a target virtual resource in the virtual resource requirement list, assistance request information of the target virtual resource is sent to a second game client.

In the embodiment shown in FIG. 3, firstly, in response to the triggering operation on the first associated region of the game backpack button, the virtual resource requirement list of the game player corresponding to the first game client may be displayed in the first game client; secondly, in response to the triggering operation of selecting the target virtual resource in the virtual resource requirement list, assistance request information of the target virtual resource may be sent to a second game client. On one hand, based on the triggering operation on the first associated region of the game backpack button, the present disclosure may directly display the virtual resource requirement list of the game player, without the need for the game player to open the game backpack to determine a required virtual resource from the existing virtual resources, which simplifies the operation steps and makes the sending of the assistance request information more convenient and flexible. On the other hand, the present disclosure may save an occupied area of the game operation interface by displaying the virtual resource requirement list of the game player on the game client, and avoid the influence of large-area occlusion on the game operation when opening the game backpack to check the required supply. In addition, based on the triggering operation of selecting the target virtual resource in the virtual resource requirement list, the present disclosure may directly send the assistance request information to the second game client, thus improving the sending efficiency of the assistance request information.

The specific implementation of each step in the embodiment shown in FIG. 3 is described in detail below:

In step S310, in response to a triggering operation on a first associated region of a game backpack button, a virtual resource requirement list of a game player corresponding to a first game client is displayed in the first game client.

In an embodiment, the first associated region is a region triggered by the game backpack button to display the virtual resource requirement list.

Before triggering the first associated region of the game backpack button, the first associated region may be configured for the game backpack button in the game interface such that the first game client may trigger the first associated region through the game backpack button to display the virtual resource requirement list of the game player corresponding to the first game client.

The specific implementation of configuring the first associated region for the game backpack button has been described in above step S110, which will not be described herein.

For example, the triggering operation on the first associated region of the game backpack button in the step S310 includes a first triggering operation for the game backpack button, and at least a part of an operation position of the first triggering operation is located in the first associated region.

Furthermore, the first triggering operation for the game backpack button includes an operation of sliding from the game backpack button to the first associated region. Specifically, it may be an operation of clicking the game backpack button and sliding it to the first associated region. During the sliding operation, a game backpack button or a button icon corresponding to the game backpack button may be moved with a touch point of the sliding operation, so as to provide visual feedback to the game player of the sliding operation. In an embodiment, when an area of an overlapping part between the game backpack button or its button icon and the first associated region is greater than a preset threshold, it may be determined that the game backpack button or its button icon is slid to the first associated region to trigger a relevant function of the first associated region, or as long as it is determined that the game backpack button or the button icon is in contact with the first associated region, the relevant function of the first associated region may be triggered.

The triggering operation of the first associated region is achieved by the operation of sliding the game backpack button or its button icon to the first associated region, which reuses the game backpack button, effectively reduces a risk of misoperation of the first associated region without adding controls, and is able to reduce the game player's cognitive cost of the function corresponding to the operation.

For example, during the game, when the game player of the first game client needs to request assistance with the virtual resource, the game player may drag the game backpack button to the first associated region. Meanwhile, a pop-up window of the virtual resource requirement list pops up in the game operation interface of the first game client, and the virtual resource requirement list is used to recommend the virtual resource required by the game player according to the virtual resource currently owned by the game player.

The virtual resource may include at least one of weapons, healing supplies and ammunition, and accordingly, the virtual resource requirement list includes at least one of a weapon requirement, a healing supply requirement and an ammunition requirement.

Figure 4:
FIG. 4 shows a game operation interface after triggering a first associated region in an embodiment of the present disclosure.

Specifically, the virtual resource requirement list may include a weapon requirement sub-list, a healing supply requirement sub-list, and an ammunition requirement sub-list, as shown in a requirement sorting list in FIG. 4. The virtual resource in each virtual resource sub-list may be recommended and sorted to display according to a preset rule.

For example, for the weapon requirement sub-list, the weapon requirements may be recommended and sorted for the game player according to a preset weapon type sorting rule. Specifically, based on currently-owned weapons of the game player, required weapons may be recommended to the game player according to an order of "melee weapon—small firearm-close range firearm—medium range firearm-special firearm", and the recommended weapons are sorted and displayed from top to bottom in the weapon requirement sub-list according to the recommended order. For the healing supply requirement sub-list, the healing supplies may be recommended and sorted according to a threshold range corresponding to a virtual life value of the game player. For example, if the virtual life value is more than 70%, small healing supplies are recommended. The specific threshold range may be set according to a specific game rule. For the ammunition requirement sub-list, an order of recommended ammunition may be determined according to an order of the recommended weapons. Specifically, the ammunition required for a weapon ranking the first is recommended.

It should be noted that the virtual resource in the virtual resource requirement list may also be determined and sorted according to other virtual resource recommendation logic, which is not limited in the present embodiment.

For example, the specific implementation of the above step S310 may be as follows: in response to the triggering operation of dragging the game backpack button to the first associated region, a pop-up window of the virtual resource requirement list of the game player corresponding to the first game client pops up and is displayed in the first game client. When a control of the game backpack button overlaps with the first associated region or an overlapping rate is greater than a certain preset threshold, the first associated region may be triggered by the game backpack button to display the pop-up window of the virtual resource requirement list.

In the embodiment, the game backpack button is associated with the first associated region, and the relevant function of the first associated region, such as the display of virtual resource requirement list, is triggered by the game backpack button. Compared with the operation of directly clicking the first associated region, on one hand, the sending of the assistance request information may be linked with the game backpack button to enhance the realism of the game and improve the game player's experience. On the other hand, since only the game backpack button may trigger the first associated region, it may reduce a probability of mistakenly triggering the first associated region by the game player during other game operations, and improve the accuracy of the sending of the assistance request information. The first associated region may be triggered in response to other operations such as click operations as required, to display the virtual resource requirement list, which is not limited in the present embodiment.

After the first associated region is triggered by the game backpack button, the virtual resource requirement list may be directly displayed, and the required virtual resource is recommended to the game player through the virtual resource requirement list, so as to save the process of opening the game backpack and determining the required virtual resource through the existing virtual resources in the game backpack by the game player himself/herself, simplify the operation steps of the game player, facilitate user to quickly determine the required virtual resource, and improve the efficiency of sending the assistance request information of the virtual resource.

Furthermore, compared with opening the game backpack to check the lacking virtual resource, the virtual resource requirement list displayed in the form of the pop-up window may save the occupied space of the operation interface. In addition, since the pop-up window has a closing control, when the game player triggers the pop-up window by misoperation, the pop-up window may be closed in time to avoid mis-sending of the assistance request information and further improve the accuracy of information sending.

Further referring to FIG. 3, after the virtual resource requirement list is displayed, in step S320, in response to the triggering operation of selecting the target virtual resource in the virtual resource requirement list, the assistance request information of the target virtual resource is sent to the second game client.

The second game client in step S320 includes a game client corresponding to a game player in the same game group as a game player corresponding to the first game client.

For example, the triggering operation of selecting the target virtual resource in the virtual resource requirement list includes: an operation of moving the target virtual resource selected in the virtual resource requirement list to a preset assistance request information sending region, or an operation of clicking the target virtual resource in the virtual resource requirement list. The preset assistance request information sending region may include a region that may directly send the assistance request information of the target virtual resource by the trigger of the target virtual resource, as shown by word "request assistance" in the requirement sorting list in FIG. 4.

For example, after the virtual resource requirement list is displayed in the first game client, the game player of the first game client may select the required virtual resource in the virtual resource requirement list. Specifically, as shown in FIG. 4, a requirement type of the virtual resource may be switched via a control "weapons, healing supplies, ammunition" in the requirement sorting list. Furthermore, for example, the game player determines that the required virtual resource is "Mk14 marksman rifle" in the requirement sorting list, and then the game player may drag the "Mk14 marksman rifle" to an assistance request region on the right, so as to send assistance request information of "Mk14 marksman rifle" to the game client of another game player in the same group, or the game player may also directly click a list bar where "Mk14 marksman rifle" is located, so as to send assistance request information of "Mk14 marksman rifle" to the game client of another game player in the same group.

For example, the specific implementation of sending the assistance request information of the target virtual resource to the second game client may be as follows: a game player identification of the game player of the first game client and the assistance request information of the corresponding target virtual resource is broadcast to the game client corresponding to the game player of the same group. The game player identification includes an ID (identification) of the game player and a serial number of the game player in a current game, such as player No. 1 and player No. 2, etc.

Figure 5:
FIG. 5 shows a game operation interface after sending assistance request information in an embodiment of the present disclosure.

Referring to FIG. 5, by sending the assistance request information in the form of broadcast, the first game client may also receive the assistance request information, 'player No. ① AA requesting support for Mk14 marksman rifle', sent by himself/herself, which may help the game player of the first game client determine that the assistance request information has been sent successfully.

Through the above steps S310-S320, the efficiency of sending the assistance request information of the target virtual resource in the game is improved, the operation steps of sending the assistance request information is simplified, and the accuracy of sending the assistance request information is improved.

Furthermore, a method for transferring a virtual resource in a game is also provided in an embodiment of the present disclosure. Referring to FIG. 6, the method may include steps S610-S630.

In step S610, assistance request information of a target virtual resource sent by a first game client is received.

For example, the second game client may receive the assistance request information of the target virtual resource sent by the first game client in above step S310. The second game client includes a game client corresponding to a game player in the same group as a game player corresponding to the first game client.

Specifically, the assistance request information includes an identification of the target virtual resource required by the first game client and an identification of the game player of the first game client.

Next, in step S620, in response to a triggering operation on a target second associated region of a game backpack button, a virtual resource list of a game player corresponding to a second game client is displayed in the second game client.

The target second associated region includes a region where the second game client is triggered by the game backpack button in response to the assistance request information of a target first game client.

Before the triggering operation on the target second associated region of the game backpack button, the second associated region may be configured for the game backpack button such that the second game client may trigger the second associated region through the game backpack button.

The specific implementation of configuring the second associated region for the game backpack button has been described in above step S120, which will not be described herein.

It should be noted that in the step S120, the first game client is a giving party of the virtual resource, and the second game client is an assistance-seeker party of the virtual resource, while in the step S620, the second game client is the giving party of the virtual resource, and the first game client is the assistance-seeker party of the virtual resource. However, the specific implementation method of configuring the second associated region for the game backpack button is the same. By exchanging technical features "first game client" and "second game client" in the step S120, the method of configuring the second associated region for the game backpack button may be implemented in the step S620.

Figure 7:
FIG. 7 shows a game operation interface after triggering a target second associated region in an embodiment of the present disclosure.

In an embodiment, the target second associated region may be determined by a game player identification of the first game client. Specifically, after receiving the assistance request information of the target virtual resource sent by the first game client, the second associated region corresponding to the game player identification is determined as the target second associated region according to the game player identification in the assistance request information. For example, the game player identification in the above first game client is ①, the target second associated region may be the region where the identification ① in FIG. 7 is located.

For example, after configuring the target second associated region for the game backpack button, before responding to the triggering operation on the target second associated region of the game backpack button, the specific implementation of displaying the target second associated region may be as follows: when a distance between the game player corresponding to the second game client and the game player corresponding to the first game client in a virtual game scene is within a preset threshold, the target second associated region of the game backpack button is displayed in the second game client.

Only the second game client that displays the target second associated region may trigger the target second associated region through the game backpack button, so as to transfer the target virtual resource to the first game client. In this way, the occupation of the display space of the game operation interface may be reduced, and a possibility of resource waste caused by a plurality of second game clients simultaneously transferring the target virtual resource to the first game client may be reduced.

For example, after configuring the target second associated region for the game backpack button, before responding to the triggering operation of the target second associated region of the game backpack button, the specific implementation of displaying the target second associated region may also be as follows: the target second associated region may be displayed in operation interfaces of the second game client corresponding to other game players in the same game group as the game player of the first game client, and when the distance between the game player corresponding to the second game client and the game player corresponding to the first game client in the virtual game scene is within the preset threshold, the target second associated region is a first display form, for example, the target second associated region is displayed in yellow; when the distance is not within the preset threshold, the target second associated region is a second display form, and for example, the target second associated region is displayed in gray.

The first display form indicates that the target second associated region may trigger a corresponding function through the game backpack button, and the second display form indicates that the triggering of the game backpack button for the target second associated region is ineffective, i.e., does not work. Correspondingly, in response to the triggering operation on the target second associated region of the game backpack button, the virtual resource list of the game player corresponding to the second game client displayed in the second game client includes: when the distance between the game player corresponding to the second game client and the game player corresponding to the first game client in the virtual game scene is within the preset threshold, the virtual resource list of the game player corresponding to the second game client is displayed in the second game client. That is, within the preset threshold, the triggering operation on the second target associated region takes effect, which may reduce the possibility of resource waste caused by the plurality of second game clients simultaneously transferring the target virtual resource to the first game client.

In an embodiment, the triggering operation on the target second associated region of the game backpack button includes a second triggering operation for the game backpack button, and at least a part of the second triggering operation is located in the target second associated region.

Furthermore, the second triggering operation for the game backpack button includes an operation of sliding from the game backpack button to the first associated region. Specifically, the game backpack button may be clicked and slid to the target second associated region, so as to trigger an operation of a relevant function in the target second associated region. During the sliding operation, a game backpack button or a button icon corresponding to the game backpack button may be moved with a touch point of the sliding operation, so as to provide visual feedback to the game player of the sliding operation. In an embodiment, when an area of an overlapping part between the game backpack button or its button icon and the target second associated region is greater than a preset threshold, it may be determined that the game backpack button or its button icon is slid to the target second associated region to trigger a relevant function of the target second associated region.

The triggering operation of the target second associated region is achieved by the operation of sliding the game backpack button or its button icon to the target second associated region, which reuses the game backpack button, effectively reduces a risk of misoperation of the target second associated region without adding controls, and is able to reduce the game player's cognitive cost of the function corresponding to the operation.

For example, in FIG. 7, the game backpack button is slid to the target second associated region ① a which indicates that the virtual resource needs to be sent to the game player with an identification ① at this time.

For example, the specific implementation of the step S620 may be as follows: in response to the operation of sliding the game backpack button to the second associated region of the game backpack button, a pop-up window of the virtual resource list of the game player corresponding to the second game client is displayed in an operation interface of the second game client. The virtual resource list includes weapons, healing supplies, ammunition, etc. currently owned by the game player of the second game client.

In an embodiment, the virtual resource list of the game player corresponding to the second game client being displayed in the second game client includes: the target virtual resource is stuck on top to display the virtual resource list with the target virtual resource on top in the second game client. The virtual resource list with the target virtual resource on top being displayed in the second game client includes a prompt display is performed on the target virtual resource on top according to preset display prompt information.

Specifically, the preset display prompt information may be any display information that may distinguish the target virtual resource from another virtual resource, such as preset color display information, in the virtual resource list.

For example, when the virtual resource list of the game player corresponding to the second game client is displayed, it may be determined whether the target virtual resource exists in the virtual resource list based on the received assistance request information, and when the target virtual resource exists in the virtual resource list, the target virtual resource may be topped and specially prompted to be displayed in the virtual resource list. As shown in the virtual resource list in FIG. 7, the target virtual resource in the received assistance request information may be topped, and the list bar displaying the target virtual resource may be displayed in yellow to distinguish it from other virtual resources in the list, which may help the game player query the target virtual resource faster and improve the efficiency of transferring the target virtual resource.

In step S630, in response to a triggering operation of selecting the target virtual resource in the virtual resource list, the target virtual resource in the virtual resource list of the game player corresponding to the second game client is transferred into a virtual resource list of a game player corresponding to the first game client.

In an embodiment, the triggering operation of selecting the target virtual resource in the virtual resource list includes: an operation of moving the target virtual resource selected in the virtual resource list to a preset virtual resource delivery region, or an operation of clicking the target virtual resource in the virtual resource list.

The preset virtual resource delivery region may include a region where the target virtual resource may be directly transferred to the virtual resource list of the game player corresponding to the target second associated region by triggering any target virtual resource, such as a region shown by a word "delivery" in the virtual resource list in FIG. 7.

For example, the specific implementation of the step S630 may be as follows: when the game player of the second game client selects the target virtual resource in the virtual resource list displayed on his/her client and drag the target virtual resource to the preset virtual resource delivery region, the target virtual resource may be directly transferred to the virtual resource list of the game player of the first game client; or when the game player of the second game client clicks the target virtual resource in the virtual resource list displayed on his/her client, the target virtual resource may be directly transferred to the virtual resource list of the game player of the first game client.

Through the above steps S610-S630, on one hand, the game backpack button is associated with the target second associated region, and the relevant function of the target second associated region are triggered by the game backpack button, for example, the virtual resource list is displayed to select the target virtual resource from the virtual resource list, which may achieve the directed transfer of the target virtual resource and improve the accuracy of the target virtual resource transfer; On the other hand, since only the game backpack button may trigger the target second associated region, it may reduce a probability of mistakenly triggering the second associated region by the game player during other game operations, and further improve the accuracy of the target virtual resource transfer.

Meanwhile, after triggering the first associated region through the game backpack button, the target virtual resource may be directly displayed on top of the virtual resource list, which may facilitate the game player to quickly query the target virtual resource and improve the efficiency of the target virtual resource transfer.

It should be noted that the target second associated region may also be triggered in response to other operations, such as click operation, to display the virtual resource list of the second game client, so as to select the target virtual resource in the virtual resource list to achieve the directed delivery, which is not limited in the present embodiment.

For example, a control associated with the teammate is arranged in a preset range of a teammate information bar of the game operation interface. When the target virtual resource needs to transfer to a certain teammate, the control associated with the teammate information bar corresponding to the teammate is directly clicked in the operation interface of the current game client. If the game player of the current game client owns the target virtual resource, the target virtual resource may be directly transferred to the target teammate in response to the triggering operation of clicking the associated control of the target teammate information bar, so as to achieve the directed transfer of the target virtual resource.

A person skilled in the art may understand that all or some of the steps of the foregoing implementations are implemented as computer programs executed by a CPU. When the computer programs are executed by the CPU, the foregoing functions defined by the foregoing methods provided in the present disclosure are implemented. The programs may be stored in a computer-readable storage medium. The storage medium may be a read-only memory, a magnetic disk, an optical disc, or the like.

In addition, it should be noted that the foregoing accompanying drawings are merely schematic descriptions of processing included in the methods of embodiments in the present disclosure, and are not used for a limitative purpose. It is easy to understand that the processing shown in the foregoing accompanying drawings does not indicate or limit a chronological order of such processing. In addition, it is also easy to understand that such processing may be, for example, synchronously performed or asynchronously performed in a plurality of modules.

Figure 8:
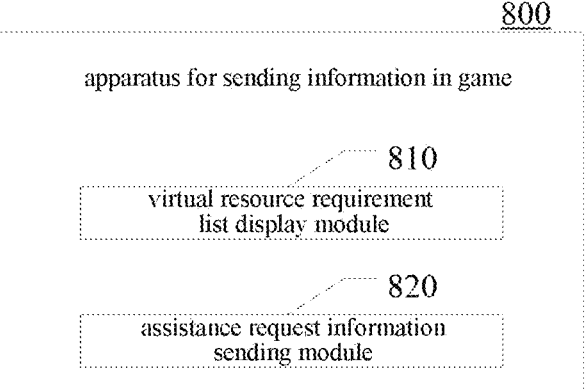
FIG. 8 shows a structure diagram of an apparatus for sending information in a game in an embodiment of the present disclosure.

FIG. 8 shows a structure diagram of an apparatus for sending information in a game in an embodiment of the present disclosure. Referring to FIG. 8, the apparatus 800 for sending information in the game includes: a virtual resource requirement list display module 810 and an assistance request information sending module 820.

The above virtual resource requirement list display module 810 is configured to display the virtual resource requirement list of a game player corresponding to a first game client in response to a triggering operation on a first associated region of a game backpack button;

The above assistance request information sending module 820 is configured to send assistance request information of the target virtual resource to a second game client in response to a triggering operation of selecting a target virtual resource in the virtual resource requirement list.

In this embodiment, based on the above solution, the first associated region in the virtual resource requirement list display module 810 is the area triggered by the game backpack button to display the virtual resource requirement list.

In this embodiment, based on the above solution, in the above virtual resource requirement list display module 810, the triggering operation on the first associated region of the game backpack button includes:

a first triggering operation for the game backpack button, and at least a part of an operation position of the first triggering operation is located in the first associated region.

In this embodiment, based on the above solution, the virtual resource requirement list display module 810 includes a first sliding unit, which is specifically configured as:

an operation of sliding from the game backpack button to the first associated region.

In this embodiment, based on the above solution, the above assistance request information sending module 820 includes a target virtual resource selection unit, which is specifically configured as:

an operation of moving the target virtual resource selected in the virtual resource requirement list to a preset assistance request information sending region, or an operation of clicking the target virtual resource in the virtual resource requirement list.

Figure 9:
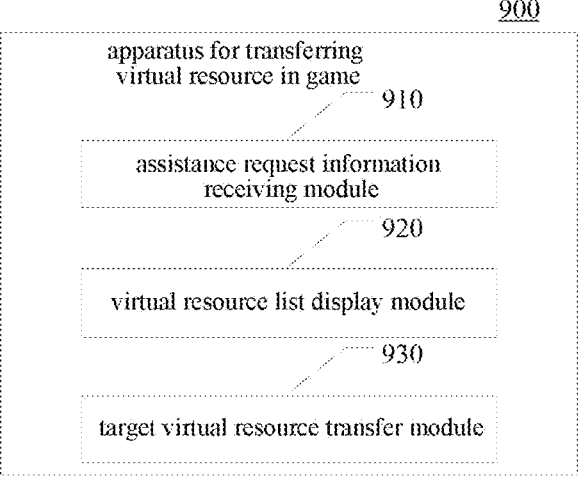
FIG. 9 shows a structure diagram of an apparatus for transferring a virtual resource in a game in an embodiment of the present disclosure.

FIG. 9 shows a structure diagram of an apparatus for transferring a virtual resource in a game in an embodiment of the present disclosure. Referring to FIG. 9, the apparatus 900 for transferring a virtual resource in the game includes: an assistance request information receiving module 910, a virtual resource list display module 920, and a target virtual resource transfer module 930.

The assistance request information receiving module 910 is configured to receive assistance request information of a target virtual resource sent by a first game client;

The virtual resource list display module 920 is configured to display a virtual resource list of a game player corresponding to a second game client in the second game client in response to a triggering operation on a target second associated region of a game backpack button;

The target virtual resource transfer module 930 is configured to transfer a target virtual resource in the virtual resource list of the second game client into a virtual resource list of a game player corresponding to the first game client in response to a triggering operation of selecting the target virtual resource in the virtual resource list.

In this embodiment, based on the above solution, the above virtual resource list display module 920 is specifically configured to:

when a distance between the game player corresponding to the second game client and the game player corresponding to the first game client in a virtual game scene is within a preset threshold, display the virtual resource list of the game player corresponding to the second game client in the second game client.

In this embodiment, based on the above solution, the above virtual resource list display module 920 is specifically configured to:

when a distance between the game player corresponding to the second game client and the game player corresponding to the first game client in a virtual game scene is within a preset threshold, display the target second associated region of the game backpack button in the second game client.

In this embodiment, based on the above solution, the above virtual resource list display module 920 includes a second moving unit, which is specifically configured as:

an operation of sliding from the game backpack button to the target second associated region.

In this embodiment, based on the above solution, the above virtual resource list display module 920 is also specifically configured to:

display the virtual resource list with the target virtual resource on top in the second game client by sticking the target virtual resource on top.

In this embodiment, based on the above solution, the above virtual resource list display module 920 is also specifically configured to perform a prompt display on the target virtual resource on top according to preset display prompt information.

In this embodiment, based on the above solution, the above target virtual resource transfer module 930 includes a target virtual resource determination unit, which is specifically configured as:

an operation of moving the target virtual resource selected in the virtual resource list to a preset virtual resource delivery region, or an operation of clicking the target virtual resource in the virtual resource list.

Figure 10:
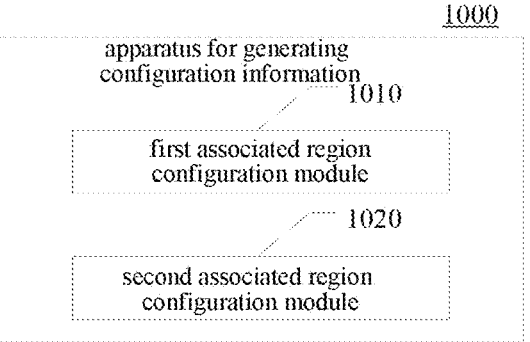
FIG. 10 shows a structure diagram of an apparatus for generating configuration information in an embodiment of the present disclosure.

FIG. 10 shows a structure diagram of an apparatus for generating configuration information in an embodiment of the present disclosure. The apparatus 1000 for generating configuration information is used for transferring a virtual resource in a game. Referring to FIG. 10, the apparatus 1000 includes:

a first associated region configuration module 1010, configured to configure a first associated region for a game backpack button, such that a first game client triggers the first associated region through the game backpack button to send assistance request information of the virtual resource to a second game client;

a second associated region configuration module 1020, configured to configure at least one second associated region for the game backpack button, such that the first game client triggers a target second associated region through the game backpack button to transfer the virtual resource to a game player of a target second game client;

In an embodiment, based on the foregoing solution, the first game client in the apparatus 1000 includes a game client corresponding to a game player in the same game group as a game player corresponding to the second game client.

The specific details of each unit in the above apparatuses 800, 900 and 1000 have been described in detail in the corresponding methods of each device, which will not be repeated here.

It should be noted that although several modules or units of the apparatus for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

In an embodiment of the present disclosure, there is also provided a computer-readable storage medium on which a program product capable of implementing the above method of the disclosure is stored. In some possible implementation manners, various aspects of the present disclosure may also be implemented in the form of a program product, including program code which, when being executed by a terminal device, causes the terminal device to implement steps of various embodiments described in the forgoing "detailed description" part of the specification.

Figure 11:
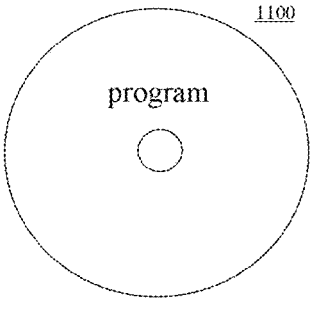
FIG. 11 shows a structure diagram of a computer storage medium in an embodiment of the present disclosure.

Referring to FIG. 11, a program product 1100 for implementing the above method according to an embodiment of the present disclosure is described. It may be implemented using a portable compact disk read-only memory (CD-ROM) and includes a program code, and may be executed by a terminal device, for example, a personal computer. However, the program product of the present disclosure is not limited thereto. In the disclosure, the readable storage medium may be any tangible medium containing or storing a program, which may be used by or in combination with an instruction execution system, apparatus, or device.

The program product may employ any combination of one or more readable medium. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples of readable storage medium (non-exhaustive list) may include: electrical connections with one or more wires, portable disks, hard disks, random access memory (RAM), read only memory (ROM), erasable programmable read-only memory (EPROM or flash memory), optical fiber, portable compact disk read-only memory (CD-ROM), optical storage device, magnetic storage device, or any suitable combination of the foregoing.

The computer-readable signal medium may include a data signal that is transmitted in baseband or as part of a carrier wave, in which readable program code is carried. This transmitted data signal can take many forms, including but not limited to electromagnetic signals, optical signals, or any suitable combination of the above. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which may include an object oriented programming language, such as the Java and C++, or may include conventional formula programming language, such as "C" language or similar programming language. The program code may be entirely executed on the user computing device, partly executed on the user device, executed as an independent software package, partly executed on the user computing device and partly executed on a remote computing device, or entirely executed on the remote computing device or server. In situations involving a remote computing device, the remote computing device may be connected to the user computing device through any kind of network, including a local area network (LAN) or a wide area network (WAN), or may be connected to an external computing device (e.g., through a connection via internet using an internet service provider).

In an embodiment of the present disclosure, there is also provided an electronic device capable of implementing the above method.

Those skilled in the art can understand that various aspects of the present disclosure can be implemented as a system, a method, or program product. Therefore, various aspects of the present disclosure may be specifically implemented in the form of: a complete hardware implementation, a complete software implementation (including firmware, microcode, etc.), or a combination of hardware and software implementations, which may be collectively referred to herein as "circuit", "module" or "system".

An electronic device 1200 according to an embodiment of the present disclosure is described below with reference to FIG. 12. The electronic device 1200 shown in FIG. 12 is only an example, and should not impose any limitation on the functions and scope of use of the embodiments of the present disclosure.

Figure 12:
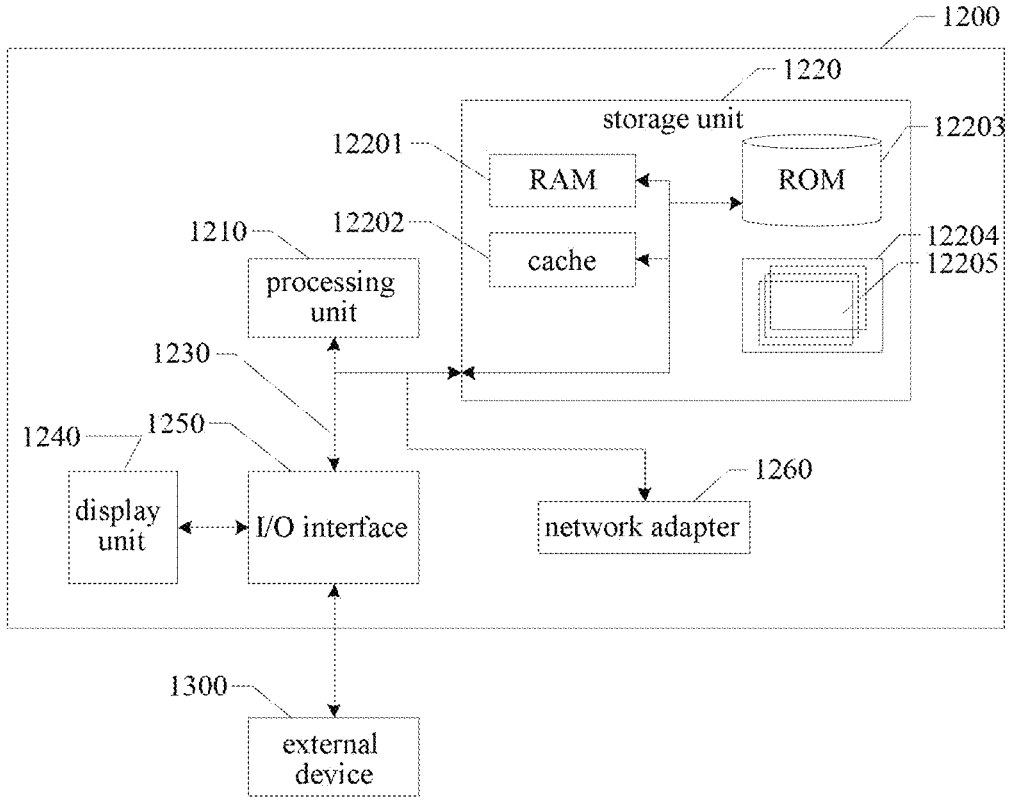
FIG. 12 shows a structure diagram of an electronic device in an embodiment of the present disclosure.

As shown in FIG. 12, the electronic device 1200 is shown in the form of a general-purpose computing device. The components of the electronic device 1200 may include, but are not limited to, at least one processing unit 1210, at least one storage unit 1220, a bus 1230 connecting different system components (including the storage unit 1220 and the processing unit 1210), and a display unit 1240.

The storage unit stores program codes and the program codes can be executed by the processing unit 1210, so that the processing unit 1210 executes the steps of various embodiments according to the present disclosure described in the "exemplary methods" section of the present specification. For example, the processing unit 1210 may perform the following steps shown in FIG. 1: at step S110, configuring a first associated region for a game backpack button, such that a first game client triggers the first associated region through the game backpack button to send assistance request information of the virtual resource to a second game client; at S120, configuring at least one second associated region for the game backpack button, such that the first game client triggers a target second associated region through the game backpack button to transfer the virtual resource to a game player of a target second game client.

For another example, the processing unit 1210 may perform each step shown in FIG. 3 and FIG. 6.

The storage unit 1220 may include a readable medium in the form of a volatile storage unit, such as a random access storage unit (RAM) 12201 and/or a cache storage unit 12202, and may further include a read-only storage unit (ROM) 12203.

The storage unit 1220 may further include a program/utility tool 12204 having a set (at least one) of program modules 12205. Such program modules 12205 include, but are not limited to, an operating system, one or more application programs, other program modules, and program data. Each or some combination of these examples may include an implementation of a network environment.

The bus 1230 may be one or more of several types of bus structures, including a memory unit bus or a memory unit controller, a peripheral bus, a graphics acceleration port, a processing unit, or a local area bus using any bus structure in a variety of bus structures.

The electronic device 1200 may also communicate with one or more external devices 1300 (such as a keyboard, a pointing device, a Bluetooth device, etc.), and may also communicate with one or more devices that enable a user to interact with the electronic device 1200, and/or may also communicate with any device (such as a router, a modem) that can enable the electronic device 1200 to interact with one or more other computing devices. Such communication can be performed through an input/output (I/O) interface 1250. Moreover, the electronic device 1200 may also communicate with one or more networks (such as a local area network (LAN), a wide area network (WAN), and/or a public network, such as the Internet) through a network adapter 1260. As shown in the figure, the network adapter 1260 communicates with other modules of the electronic device 1200 through the bus 1230. It should be understood that although not shown in the figure, other hardware and/or software modules may be used in conjunction with the electronic device 1200, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to embodiments of the present disclosure.

In addition, the drawings are merely schematic descriptions of processes included in the methods according to embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

A first aspect of an embodiment of the present disclosure provides a method for sending information in the game, and the method includes:

in response to a triggering operation on a first associated region of a game backpack button, displaying a virtual resource requirement list of a game player corresponding to a first game client in the first game client;

in response to a triggering operation of selecting a target virtual resource in the virtual resource requirement list, sending assistance request information of the target virtual resource to a second game client.

In an embodiment of the present disclosure, based on the above solution, the triggering operation on the first associated region of the game backpack button includes: a first triggering operation for the game backpack button, wherein at least a part of an operation position of the first triggering operation is located in the first associated region.

In an embodiment of the present disclosure, based on the above solution, the first triggering operation for the game backpack button includes:

an operation of sliding from the game backpack button to the first associated region.

In an embodiment of the present disclosure, based on the above solution, the virtual resource requirement list includes at least one of a weapon requirement, a healing supply requirement and an ammunition requirement.

In an embodiment of the present disclosure, based on the above solution, the triggering operation of selecting the target virtual resource in the virtual resource requirement list includes:

an operation of moving the target virtual resource selected in the virtual resource requirement list to a preset assistance request information sending region, or an operation of clicking the target virtual resource in the virtual resource requirement list.

In an embodiment of the present disclosure, based on the above solution, the second game client includes a game client corresponding to a game player in a same game group as a game player corresponding to the first game client.

A second aspect of an embodiment of the present disclosure provides a method for transferring a virtual resource in a game, and the method includes:

receiving assistance request information of a target virtual resource sent by a first game client;

in response to a triggering operation on a target second associated region of a game backpack button, displaying a virtual resource list of a game player corresponding to a second game client in the second game client;

in response to a triggering operation of selecting the target virtual resource in the virtual resource list, transferring the target virtual resource in the virtual resource list of the second game client into a virtual resource list of a game player corresponding to the first game client;

wherein the target second associated region includes a region where the second game client is triggered by the game backpack button in response to the assistance request information of a target first game client.

In an embodiment of the present disclosure, based on the above solution, the second game client includes a game client corresponding to a game player in a same game group as a game player corresponding to the first game client.

In an embodiment of the present disclosure, based on the above solution, the displaying the virtual resource list of the game player corresponding to the second game client in the second game client includes:

when a distance between the game player corresponding to the second game client and the game player corresponding to the first game client in a virtual game scene is within a preset threshold, displaying the virtual resource list of the game player corresponding to the second game client in the second game client.

In an embodiment of the present disclosure, based on the above solution, before responding to the triggering operation on the target second associated region of the game backpack button, the method further includes:

when a distance between the game player corresponding to the second game client and the game player corresponding to the first game client in a virtual game scene is within a preset threshold, displaying the target second associated region of the game backpack button in the second game client.

In an embodiment of the present disclosure, based on the above solution, the triggering operation on the target second associated region of the game backpack button includes:

a second triggering operation for the game backpack button, wherein the second triggering operation includes an operation of sliding from the game backpack button to the target second associated region.

In an embodiment of the present disclosure, based on the above solution, the triggering operation of selecting the target virtual resource in the virtual resource list includes:

an operation of moving the target virtual resource selected in the virtual resource list to a preset virtual resource delivery region, or an operation of clicking the target virtual resource in the virtual resource list.

In an embodiment of the present disclosure, based on the above solution, the displaying the virtual resource list of the game player corresponding to the second game client in the second game client includes:

displaying the virtual resource list with the target virtual resource on top in the second game client by sticking the target virtual resource on top.

In an embodiment of the present disclosure, based on the above solution, the displaying the virtual resource list with the target virtual resource on top in the second game client includes:

performing a prompt display on the target virtual resource on top according to preset display prompt information.

A third aspect of an embodiment of the present disclosure provides a method for generating configuration information, the configuration information is used for transferring a virtual resource in a game, the method includes:

configuring a first associated region for a game backpack button, such that a first game client triggers the first associated region through the game backpack button to send assistance request information of the virtual resource;

configuring at least one second associated region for the game backpack button, such that the first game client triggers a target second associated region through the game backpack button to transfer the virtual resource to a game player of a target second game client;

wherein the first game client includes a game client corresponding to a game player in a same game group as a game player corresponding to the second game client.

A fourth aspect of an embodiment of the present disclosure provides an apparatus for sending information in a game, and the apparatus includes:

a virtual resource requirement list display module, configured to display the virtual resource requirement list of a game player corresponding to a first game client in response to a triggering operation on a first associated region of a game backpack button;

an assistance request information sending module, configured to send assistance request information of the target virtual resource to a second game client in response to a triggering operation of selecting a target virtual resource in the virtual resource requirement list.

A fifth aspect of an embodiment of the present disclosure provides an apparatus for transferring a virtual resource in a game, and the apparatus includes:

an assistance request information receiving module, configured to receive assistance request information of a target virtual resource sent by a first game client;

a virtual resource list display module, configured to display a virtual resource list of a game player corresponding to a second game client in the second game client in response to a triggering operation on a target second associated region of a game backpack button;

a target virtual resource transfer module, configured to transfer a target virtual resource in the virtual resource list of the second game client into a virtual resource list of a game player corresponding to the first game client in response to a triggering operation of selecting the target virtual resource in the virtual resource list;

wherein the target second associated region includes a region where the second game client is triggered by the game backpack button in response to the assistance request information of a target first game client.

A sixth aspect of an embodiment of the present disclosure provides an apparatus for generating configuration information, wherein the configuration information is used for transferring a virtual resource in a game, the apparatus includes:

a first associated region configuration module, used to configure a first associated region for a game backpack button, such that a first game client triggers the first associated region through the game backpack button to send assistance request information of the virtual resource;

a second associated region configuration module, used to configure at least one second associated region for the game backpack button, such that the first game client triggers a target second associated region through the game backpack button to transfer the virtual resource to a game player of a target second game client;

wherein the first game client includes a game client corresponding to a game player in a same game group as a game player corresponding to the second game client.

A seventh aspect of an embodiment of the present disclosure provides a computer-readable storage medium having a computer program stored thereon that when the computer program is executed by a processor, performs at least one of the method for sending information in the game of the above first aspect, the method for transferring the virtual resource in the game of the above second aspect, and the method for generating the configuration information of the above third aspect.

An eighth aspect of an embodiment of the present disclosure provides an electronic device, and the electronic device includes: one or a plurality of processors; a storage device configured to store one or a plurality of programs, when the one or the plurality of programs are executed by one or a plurality of processors, the one or the plurality of processors performs at least one of the method for sending information in the game of the above first aspect, the method for transferring the virtual resource in the game of the above second aspect, and the method for generating the configuration information of the above third aspect.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A method for sending information in a game, comprising:

in response to a triggering operation on a first associated region of a game backpack button, displaying, by a first game client, a virtual resource requirement list of a first game player corresponding to the first game client in the first game client;

in response to a triggering operation of selecting a target virtual resource in the virtual resource requirement list, sending, by the first game client, assistance request information of the target virtual resource to a second game client; wherein the target virtual resource is a virtual resource required by the first game player;

wherein in response to the assistance request information, the second game client reorders a virtual resource list of a second game player corresponding to the second game client, such that the target virtual resource of the second game player is displayed at a topmost position that remains visible without scrolling until one of:

transfer of the target virtual resource;

dismissal of the assistance request information, or expiration of a preset timeout.

2. The method according to claim 1, wherein the triggering operation on the first associated region of the game backpack button comprises:

a first triggering operation for the game backpack button, wherein at least a part of an operation position of the first triggering operation is located in the first associated region.

3. The method according to claim 1, wherein the first triggering operation for the game backpack button comprises:

an operation of sliding from the game backpack button to the first associated region.

4. The method according to claim 1, wherein the virtual resource requirement list comprises at least one of a weapon requirement, a healing supply requirement or an ammunition requirement.

5. The method according to claim 4, wherein the weapon requirement is recommended and sorted for the first game player according to a preset weapon type sorting rule, the healing supply requirement is recommended and sorted for the first game player according to a threshold range corresponding to a virtual life value of the first game player, and the ammunition requirement is recommended and sorted for the first game player according to an order of recommended weapons.

6. The method according to claim 1, wherein the triggering operation of selecting the target virtual resource in the virtual resource requirement list comprises:

an operation of moving the target virtual resource to a preset assistance request information sending region, or an operation of clicking the target virtual resource in the virtual resource requirement list.

7. The method according to claim 1, wherein the second game client comprises a game client corresponding to a game player in a same game group as the first game player.

8. The method according to claim 1, wherein a second game player corresponding to the second game client transfers the target virtual resource to the first game player according to the assistance request information sent by the first game client; and wherein the virtual resource requirement list is configured to recommend virtual resource required by the first game player according to virtual resource currently owned by the first game player.

9. The method according to claim 1, further comprising:

in response to an opening operation on the game backpack button in the first game client, displaying, by the first game client, a game backpack interface in the first game client, wherein the game backpack interface is configured to display virtual resource carried by the first game player; and in response to determining that a control of the game backpack button overlaps with the first associated region or an overlapping rate between the control of the game backpack button and the first associated region is greater than a preset threshold, displaying a pop-up window of the virtual resource requirement list in the first associated region.

10. A method for transferring a virtual resource in a game, comprising:

receiving, by a second game client, assistance request information of a target virtual resource sent by a first game client; wherein the target virtual resource is a virtual resource required by a first game player corresponding to the first game client;

in response to a triggering operation on a target second associated region of a game backpack button of a second game player, displaying a virtual resource list of the second game player corresponding to the second game client in the second game client;

in response to a triggering operation of selecting the target virtual resource in the virtual resource list of the second game player, transferring, by the second game client, the target virtual resource in the virtual resource list of the second game player into a virtual resource list of the first game player;

wherein the target second associated region comprises a region where the second game client is triggered by the game backpack button in response to the assistance request information of a target first game client;

wherein displaying the virtual resource list of the second game player in the second game client comprises:

reordering the virtual resource list according to the assistance request information, such that the target virtual resource is displayed at a topmost position that remains visible without scrolling until one of:

transfer of the target virtual resource;

dismissal of the assistance request information, or expiration of a preset timeout.

11. The method according to claim 10, wherein the second game client comprises a game client corresponding to a game player in a same game group as the first game player.

12. The method according to claim 10, wherein displaying the virtual resource list of the second game player in the second game client comprises:

in response to a distance between the second game player and the first game player in a virtual game scene within a preset threshold, displaying the virtual resource list of the second game player in the second game client.

13. The method according to claim 10, further comprising:

in response to a distance between the second game player and the first game player in a virtual game scene within a preset threshold, displaying the target second associated region in the second game client.

14. The method according to claim 10, wherein the triggering operation on the target second associated region comprises:

a second triggering operation for the game backpack button, wherein the second triggering operation comprises an operation of sliding from the game backpack button to the target second associated region.

15. The method according to claim 10, wherein the triggering operation of selecting the target virtual resource in the virtual resource list of the second game player comprises:

an operation of moving the target virtual resource to a preset virtual resource delivery region, or an operation of clicking the target virtual resource in the virtual resource list.

16. The method according to claim 10, wherein displaying the virtual resource list with the target virtual resource on top in the second game client comprises:

performing a prompt display on the target virtual resource on top according to preset display prompt information.

17. The method according to claim 10, further comprising:

in response to a distance between the second game player and the first game player in a virtual game scene within a preset threshold, displaying the target second associated region in a first display form; and in response to a distance between the second game player and the first game player in a virtual game scene beyond a preset threshold, displaying the target second associated region in a second display form.

18. The method according to claim 10, wherein sticking the target virtual resource required by the first game player on top of the virtual resource list of the second game player according to the assistance request information comprises:

determining, according to the assistance request information, whether the target virtual resource exists in the virtual resource list of the second game player; and in a case that the target virtual resource exists in the virtual resource list of the second game player, reordering the virtual resource list according to the assistance request information, such that the target virtual resource is displayed at a topmost position that remains visible without scrolling until one of:

transfer of the target virtual resource;

dismissal of the assistance request information, or expiration of a preset timeout.

19. The method according to claim 10, wherein a plurality of first game players and the second game player are in a same group;

wherein the game backpack button of the second game player is provided with a plurality of second associated regions corresponding to the plurality of first game players, and a number of the second associated regions is determined according to a number of the first game players;

wherein a second associated region corresponding to the first game player that sends the assistance request information is determined as the target second associated region.

20. A method for generating configuration information, comprising:

configuring a first associated region for a game backpack button, such that a first game client triggers the first associated region through the game backpack button to send assistance request information of a virtual resource to a second game client; wherein the configuration information is used for transferring the virtual resource in a game;

configuring at least one second associated region for the game backpack button, such that the first game client triggers a target second associated region through the game backpack button to transfer the virtual resource to a game player of a target second game client;

wherein the first game client comprises a game client corresponding to a game player in a same game group as a second game player corresponding to the second game client;

wherein the first associated region is within a preset distance range to the game backpack button, the second associated region is within a preset distance range to the game backpack button, and no overlapping part exists between positions of the first associated region and the second associated region.

* * * * *